H. C. ROYER.
ARTIFICIAL MINNOW.
APPLICATION FILED SEPT. 21, 1911.

1,031,149.

Patented July 2, 1912.

Witnesses:
J. D. Thornburgh.

Inventor:
Henry Clay Royer.

_

UNITED STATES PATENT OFFICE.

HENRY CLAY ROYER, OF TERMINAL ISLAND, CALIFORNIA.

ARTIFICIAL MINNOW.

1,031,149.   Specification of Letters Patent.   Patented July 2, 1912.

Application filed September 21, 1911. Serial No. 650,651.

*To all whom it may concern:*

Be it known that I, HENRY CLAY ROYER, a citizen of the United States, residing at Terminal Island, in the county of Los Angeles and State of California, have invented a new and useful Artificial Minnow, of which the following is a specification.

This invention relates to artificial or imitation fish of small size, known as minnows which are used as bait or lures for larger fish.

The main object of the invention is to provide a bait of this character which is of extreme cheapness and superior effectiveness in catching fish.

A further object of the invention is to provide an artificial minnow which will simulate to a large extent, the appearance of a live minnow.

Another object of the invention is to provide for maintaining upright or edgewise position of the imitation fish or minnow and of the hook thereof.

Other objects of the invention will appear hereinafter.

Figure 1:
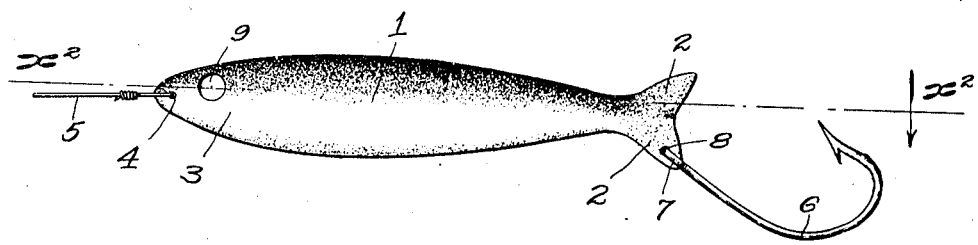
Figure 2:
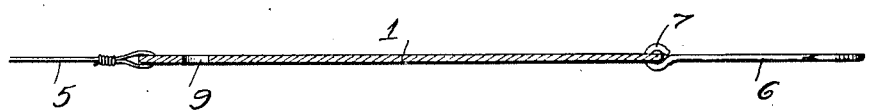

The accompanying drawings illustrate an embodiment of the invention, and referring thereto: Figure 1 is a side elevation of the minnow. Fig. 2 is a longitudinal section on line $x^2$—$x^2$ in Fig. 1.

The minnow consists of a body or member 1, preferably formed of sheet metal cut in shape to correspond to the general outline of the minnow, said body terminating at its rear end in a tail portion formed with upper and lower diverging portions 2. At its forward end or head portion 3 the body 1 is provided with a perforation 4 to receive the line 5 of the tackle. A hook 6 is attached to the rear end of the minnow, said hook having an eye 7 which engages in a perforation 8 through the lower portion 2 of the tail, this perforation 8 being below the center line of the body 1, and the perforation 4 being on the center line or longitudinal axis of the body 1 so that the pull of the hook on the minnow holds the body 1 upright. In its head or forward portion the body 1 is formed with an opening 9 corresponding in size and position to the eye of a minnow, and the body 1 being of metal or other opaque substance, this opening appearing as a spot when the bait is being drawn through the water, simulating the appearance of a fish's eye much more effectually than is the case with the ordinary glass eye of the artificial bait in common use.

The minnow is used in the ordinary manner of trolling and casting bait, the line 5 being drawn through the water so as to keep the bait in more or less motion, and in such motion the hook 6 drags behind the bait, the effect of the motion and of gravity keeping the hook in about the position shown, with its point turned upwardly in effective position for striking and catching any fish which strikes at the bait. When the minnow is being drawn through the water in this manner the opening 9 appears, when viewed from either side, as a spot which simulates the effect of the reflection from an ordinary fish's eye. I have found that the motion of the flat body 1, through the water, with the hook attached as stated, below the central line or axis of the body, keeps the body in a general upright or on edge position, but there is a slight swaying from side to side which greatly increases the effectiveness of the bait, as it simulates the swaying movement of a live minnow and gives the general appearance of vitality to the bait. In fact, the simulation of a live minnow is so complete when the body is in motion that the fish strike or take the bait much more readily than with the usual artificial minnow. In practice I have painted the body 1 of the bait with dark back and lighter belly to simulate more closely the appearance of a minnow, as shown, but my invention is not limited to such coloration.

I have found that the connection of the hook to the expanded tail portion of the body 1 at a point below the longitudinal axis of the body is necessary in order to keep the body in an upright position as it is drawn through the water, the gravitative effect of the hook on the body being exerted at the point of connection, and therefore holding the body upright, as it is exerted below the line of pull and the line of mean resistance both of which are in the longitudinal axis of the body, the perforation 4 for connection of the line being on such longitudinal axis.

What I claim is:

An artificial fish bait consisting of a flat fish shaped plate of sheet metal, provided at its forward end with means for attachment of a line, and having at its rear end an expanded tail portion and a hook connected to the expanded tail portion at a point below the longitudinal axis of the body said longitudinal axis passing through the part of attachment of the line.

In testimony whereof, I have hereunto set my hand at Los Angeles, California this 15th day of September, 1911.

HENRY CLAY ROYER.

In presence of—
ARTHUR P. KNIGHT,
GLADYS RUSSELL.